United States Patent
Ge et al.

(10) Patent No.: US 11,416,703 B2
(45) Date of Patent: Aug. 16, 2022

(54) NETWORK OPTIMIZATION METHOD AND APPARATUS, IMAGE PROCESSING METHOD AND APPARATUS, AND STORAGE MEDIUM

(71) Applicant: BEIJING SENSETIME TECHNOLOGY DEVELOPMENT CO., LTD., Beijing (CN)

(72) Inventors: Yixiao Ge, Beijing (CN); Yantao Shen, Beijing (CN); Dapeng Chen, Beijing (CN); Xiaogang Wang, Beijing (CN); Hongsheng Li, Beijing (CN)

(73) Assignee: BEIJING SENSETIME TECHNOLOGY DEVELOPMENT CO., LTD.

(*) Notice: Subject to any disclaimer, the term of this patent is extended or adjusted under 35 U.S.C. 154(b) by 135 days.

(21) Appl. No.: 17/037,654

(22) Filed: Sep. 29, 2020

(65) Prior Publication Data
US 2021/0012154 A1    Jan. 14, 2021

Related U.S. Application Data

(63) Continuation of application No. PCT/CN2019/118922, filed on Nov. 15, 2019.

(51) Int. Cl.
*G06K 9/62* (2022.01)
*G06N 3/08* (2006.01)
(Continued)

(52) U.S. Cl.
CPC ......... *G06K 9/6232* (2013.01); *G06K 9/6267* (2013.01); *G06N 3/08* (2013.01);
(Continued)

(58) Field of Classification Search
CPC ...... G06N 3/08; G06N 3/0454; G06N 3/0472; G06N 3/084; G06N 3/006; G06N 3/04;
(Continued)

(56) References Cited

U.S. PATENT DOCUMENTS 10,163,042 B2    12/2018  Cheng et al.
10,922,534 B2 *   2/2021  Zavesky ............... A63F 13/655
(Continued)

FOREIGN PATENT DOCUMENTS

CN       106778604 A     5/2017
CN       107704838 A     2/2018
(Continued)

OTHER PUBLICATIONS

International Application No. PCT/CN2019/118922, International Search Report and Written Opinion dated Feb. 17, 2020.
(Continued)

*Primary Examiner* — Michael S Osinski
(74) *Attorney, Agent, or Firm* — Ahmann Kloke LLP

(57) ABSTRACT

The present disclosure relates to a network optimization method and apparatus, an image processing method and apparatus, and a storage medium. The network optimization method includes: obtaining an image sample group; obtaining a first feature and a second feature of an image in the image sample group, and obtaining a first classification result by using the first feature of the image; performing feature exchange processing on an image pair in the image sample group to obtain a new image pair; obtaining a first loss value of the first classification result, a second loss value of the new image pair, and a third loss value of first features and second features of the new image pair in a preset manner; and adjusting parameters of a neural network at least according to the first loss value, the second loss value, and the third loss value until a preset requirement is met.

20 Claims, 5 Drawing Sheets

(51) Int. Cl.
  *G06T 5/00*  (2006.01)
  *G06V 10/40* (2022.01)
(52) U.S. Cl.
  CPC .............. *G06T 5/002* (2013.01); *G06V 10/40* (2022.01); *G06T 2207/20084* (2013.01)
(58) Field of Classification Search
  CPC ........ G06N 3/082; G06N 3/003; G06N 20/10; G06N 20/00; G06T 5/002; G06T 2207/20084; G06T 2207/20081; G06T 2207/30196; G06T 2207/10024; G06T 2207/10028; G06T 7/11; G06T 7/74; G06T 7/73; G06T 7/75; G06T 7/90; G06V 10/40; G06V 10/82; G06V 10/454; G06V 10/44; G06V 40/10; G06V 40/103; G06V 40/20; G06V 40/168; G06V 40/171; G06V 40/172; G06V 40/174; G06K 9/627; G06K 9/6271; G06K 9/6262; G06K 9/6232; G06K 9/6256; G06K 9/6267; G06K 9/00523; G06K 9/00536
  See application file for complete search history.

(56) References Cited

U.S. PATENT DOCUMENTS

| | | | | |
|---|---|---|---|---|
| 11,048,919 B1* | 6/2021 | Modolo | ................ | G06V 20/40 |
| 11,120,078 B2* | 9/2021 | Tang | ................ | H04N 21/4826 |
| 11,205,270 B1* | 12/2021 | Asmi | ................ | G06V 40/10 |
| 11,222,231 B2* | 1/2022 | Zhang | ................ | G06N 3/0454 |
| 2013/0142423 A1* | 6/2013 | Zhang | ................ | G06K 9/6256 382/159 |
| 2013/0259372 A1* | 10/2013 | Xu | ................ | G06V 20/00 382/218 |
| 2014/0270536 A1* | 9/2014 | Amtrup | ................ | G06K 9/00536 382/195 |
| 2017/0154212 A1* | 6/2017 | Feris | ................ | G06T 7/55 |
| 2017/0308740 A1 | 10/2017 | Dunlap | | |
| 2018/0018508 A1* | 1/2018 | Tusch | ................ | G06V 40/20 |
| 2018/0039867 A1 | 2/2018 | Cheng et al. | | |
| 2018/0144185 A1* | 5/2018 | Yoo | ................ | G06V 40/161 |
| 2018/0322367 A1* | 11/2018 | Chang | ................ | G06V 10/56 |
| 2018/0322623 A1* | 11/2018 | Memo | ................ | G06T 7/0004 |
| 2019/0220900 A1* | 7/2019 | Tazuke | ................ | G06K 9/6257 |
| 2020/0134868 A1* | 4/2020 | Liu | ................ | G06V 40/174 |
| 2020/0151881 A1* | 5/2020 | Dodd | ................ | G06T 3/40 |
| 2020/0265255 A1* | 8/2020 | Li | ................ | G06K 9/6256 |
| 2020/0334867 A1* | 10/2020 | Chen | ................ | G06V 10/82 |
| 2020/0342210 A1* | 10/2020 | Wang | ................ | G06V 10/50 |
| 2021/0073982 A1* | 3/2021 | Xia | ................ | G16H 50/20 |
| 2021/0174539 A1* | 6/2021 | Duong | ................ | G06N 5/003 |
| 2021/0183052 A1* | 6/2021 | Ikeda | ................ | G06T 7/136 |
| 2021/0201661 A1* | 7/2021 | Al Jazaery | ................ | G06V 10/454 |
| 2021/0264144 A1* | 8/2021 | Cho | ................ | G06V 10/82 |
| 2021/0279456 A1* | 9/2021 | Luo | ................ | G06V 40/10 |
| 2021/0353149 A1* | 11/2021 | Abbosh | ................ | G06K 9/6273 |

FOREIGN PATENT DOCUMENTS

| | | |
|---|---|---|
| CN | 109101866 A | 12/2018 |
| CN | 109102025 A | 12/2018 |
| CN | 109117744 A | 1/2019 |
| CN | 109190470 A | 1/2019 |
| TW | 201520907 A | 6/2015 |
| TW | 201623055 A | 7/2016 |

OTHER PUBLICATIONS

Anonymous, "Cycle-reID: Learning Identity-disentangled Person Representations with Denoising Cyclic Generative Models," IEEE Conference on Computer Vision and Pattern Recognition (CVPR 2019), Jun. 2019.

Ge, Yixiao et al. , "FD-GAN: Pose-guided Feature Distilling GAN for Robust Person Re-identification," Proceedings of the 32nd International Conference on Neural Information Processing Systems (NIPS '18), pp. 1230-1241, Dec. 2018.

* cited by examiner

NETWORK OPTIMIZATION METHOD AND APPARATUS, IMAGE PROCESSING METHOD AND APPARATUS, AND STORAGE MEDIUM

CROSS-REFERENCE TO RELATED APPLICATIONS

The present disclosure is a bypass continuation of and claims priority under 35 U.S.C. § 111(a) to PCT Application. No. PCT/CN2019/118922, filed on Nov. 15, 2019, which claims priority to Chinese Patent Application No. 201910036096.X, filed with the Chinese Patent Office on Jan. 30, 2019 and entitled "NETWORK OPTIMIZATION METHOD AND APPARATUS, IMAGE PROCESSING METHOD AND APPARATUS, AND STORAGE MEDIUM", each of which is incorporated herein by reference in its entirety.

TECHNICAL FIELD

The present disclosure relates to the field of network optimization, and in particular, to a network optimization method and apparatus, an image processing method and apparatus, and a storage medium.

BACKGROUND

Pedestrian re-identification aims to learn discriminative features for pedestrian retrieval and matching. Generally, factors such as pedestrian pose diversity and background diversity in an image data set affect the extraction of identity features. Currently, in related technologies, decomposition features are extracted by using a deep neural network for identity recognition.

SUMMARY

Embodiments of the present disclosure provide technical solutions for network optimization.

According to one aspect of the present disclosure, a network optimization method is provided; the method is used for optimizing a neural network, and includes:

obtaining an image sample group, where the image sample group includes an image pair formed by images of a same object and an image pair formed by images of different objects; obtaining a first feature and a second feature of an image in the image sample group, and obtaining a first classification result by using the first feature of the image, where the first feature includes an identity feature, and the second feature includes an attribute feature; performing feature exchange processing on an image pair in the image sample group to obtain a new image pair, where the feature exchange processing is to generate a new first image by using a first feature of a first image and a second feature of a second image in the image pair, and to generate a new second image by using a second feature of the first image and a first feature of the second image; obtaining a first loss value of the first classification result, a second loss value of the new image pair, and a third loss value of first features and second features of the new image pair in a preset manner; and adjusting parameters of a neural network at least according to the first loss value, the second loss value, and the third loss value until a preset requirement is met.

According to a second aspect of the present disclosure, an image processing method is provided, including:

receiving an input image; recognizing a first feature of the input image by means of a neural network model; and determining an identity of an object in the input image based on the first feature; where the neural network model is a network model obtained after optimization processing through the network optimization method according to any item in the first aspect.

According to a third aspect of the present disclosure, an image processing apparatus is provided, including:

an obtaining module, configured to obtain an image sample group, where the image sample group includes an image pair formed by images of a same object and an image pair formed by images of different objects; a feature coding network module, configured to obtain a first feature and a second feature of an image in the image sample group; a classification module, configured to obtain a first classification result according to the first feature of the image; a generation network module, configured to perform feature exchange processing on an image pair in the image sample group to obtain a new image pair, where the feature exchange processing is to generate a new first image by using a first feature of a first image and a second feature of a second image in the image pair, and to generate a new second image by using a second feature of the first image and a first feature of the second image; a loss value obtaining module, configured to obtain a first loss value of the first classification result, a second loss value of the new image pair, and a third loss value of first features and second features of the new image pair in a preset manner; and an adjustment module, configured to adjust parameters of the neural network at least according to the first loss value, the second loss value, and the third loss value until a preset requirement is met.

According to a fourth aspect of the present disclosure, an image processing apparatus is provided, and includes:

a receiving module, configured to receive an input image; a recognition module, configured to recognize a first feature of the input image by means of a neural network model; and an identity determination module, configured to determine an identity of an object in the input image based on the first feature; where the neural network model is a network model obtained after optimization processing through the network optimization method according to any item in the first aspect.

According to a fifth aspect of the present disclosure, an electronic device is provided, including:

a processor; and a memory configured to store processor-executable instructions; where the processor is configured to perform the method according to any item in the first aspect and the second aspect.

According to a sixth aspect of the present disclosure, a computer-readable storage medium is provided, and has computer program instructions stored thereon, where when the computer program instructions are executed by a processor, the method according to any item in the first aspect and the second aspect is implemented.

According to one aspect of the present disclosure, a computer program is provided, where the computer program includes a computer-readable code, and when the computer-readable code runs in an electronic device, a processor in the electronic device performs the above-mentioned network optimization method.

It should be understood that the foregoing general descriptions and the following detailed descriptions are merely exemplary and explanatory, but are not intended to limit the present disclosure.

The other features and aspects of the present disclosure can be described more clearly according to the detailed descriptions of the exemplary embodiments in the accompanying drawings.

BRIEF DESCRIPTION OF THE DRAWINGS

The accompanying drawings here incorporated in the present specification and constituting a part of the present specification illustrate the embodiments consistent with the present disclosure, and are intended to explain the technical solutions of the present disclosure together with the specification.

DETAILED DESCRIPTION

Figure 1:
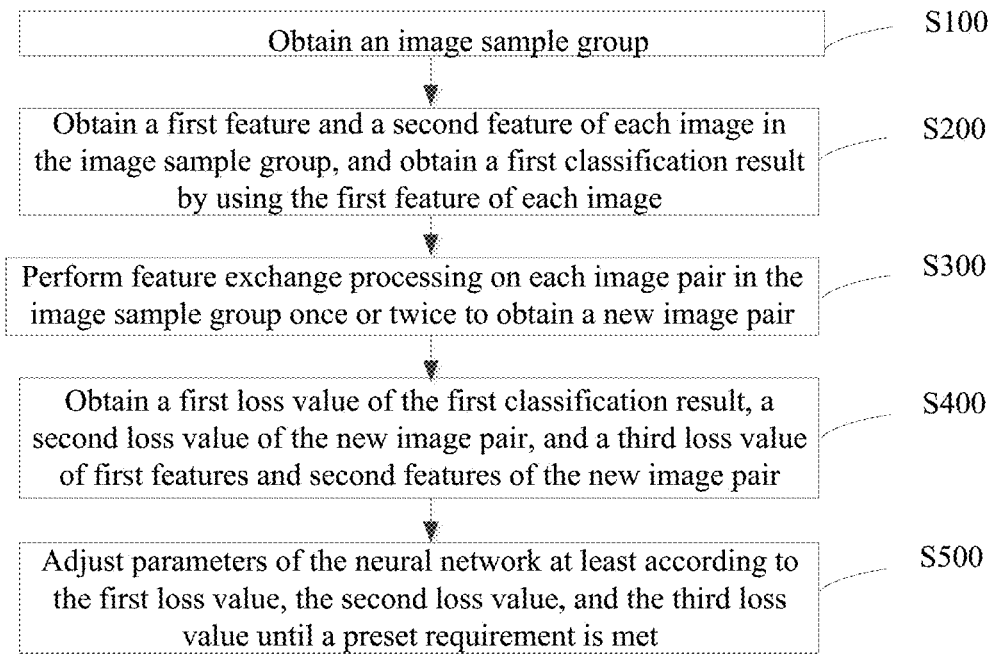
FIG. 1 is a flowchart of a network optimization method according to embodiments of the present disclosure.

The various exemplary embodiments, features, and aspects of the present disclosure are described below in detail with reference to the accompanying drawings. The same reference numerals in the accompanying drawings represent elements having the same or similar functions. Although the various aspects of the embodiments are illustrated in the accompanying drawings, unless stated particularly, it is not required to draw the accompanying drawings in proportion.

The special word "exemplary" here means "used as examples, embodiments, or descriptions". Any "exemplary" embodiment given here is not necessarily construed as being superior to or better than other embodiments.

The term "and/or" herein describes only an association relationship describing associated objects and represents that three relationships may exist. For example, A and/or B may represent the following three cases: only A exists, both A and B exist, and only B exists. In addition, the term "at least one" herein indicates any one of multiple listed items or any combination of at least two of multiple listed items. For example, including at least one of A, B, or C may indicate including any one or more elements selected from a set consisting of A, B, and C.

In addition, numerous details are given in the following detailed description for the purpose of better explaining the present disclosure. A person skilled in the art should understand that the present disclosure may also be implemented without some specific details. In some examples, methods, means, elements, and circuits well known to a person skilled in the art are not described in detail so as to highlight the subject matter of the present disclosure.

The embodiments of the present disclosure provide a network optimization method, which is used for training a neural network or other machine learning networks. For example, the network optimization method may be used in a process of training a machine learning network in scenarios in which face recognition, identity verification, and so on are performed on a target user, and may also be used in a process of training a network with a relatively high precision requirement such as identifying authenticity of images. The present disclosure does not limit specific application scenarios, and all the processes implemented using the network optimization method provided in the present disclosure are within the scope of protection of the present disclosure. In the embodiments of the present disclosure, a neural network is taken as an example for description, but no specific limitation is made thereto. After the network optimization method in the embodiments of the present disclosure is used for training, recognition precision of a character object in a network can be improved, and no auxiliary information other than an input image is required. Therefore, the network optimization method is simple and convenient.

The network optimization solution provided in the embodiments of the present disclosure is executed by a terminal device, a server, or other types of electronic devices, where the terminal device may be User Equipment (UE), a mobile device, a user terminal, a terminal, a cellular phone, a cordless phone, a Personal Digital Assistant (PDA), a handheld device, a computing device, a vehicle-mounted device, a wearable device, and the like. In some possible implementations, the network optimization method is implemented by a processor by invoking computer-readable instructions stored in a memory.

FIG. 1 is a flowchart of a network optimization method according to embodiments of the present disclosure. As shown in FIG. 1, the network optimization method in the embodiments of the present disclosure includes:

S100: obtaining an image sample group, where the image sample group includes an image pair formed by images of a same object and an image pair formed by images of different objects;

S200: obtaining a first feature and a second feature of an image in the image sample group, and obtaining a first classification result by using the first feature of the image, where the first feature includes an identity feature, and the second feature includes an attribute feature;

S300: performing feature exchange processing on an image pair in the image sample group to obtain a new image pair, where the feature exchange processing is to generate a new first image by using a first feature of a first image and a second feature of a second image in the image pair, and to generate a new second image by using a second feature of the first image and a first feature of the second image;

S400: obtaining a first loss value of the first classification result, a second loss value of the new image pair, and a third loss value of first features and second features of the new image pair in a preset manner; and S500: adjusting parameters of a neural network at least according to the first loss value, the second loss value, and the third loss value until a preset requirement is met.

In the embodiments of the present disclosure, if a neural network is trained through the embodiments of the present disclosure, an image sample group is first input to the neural network, and the image sample group is taken as a sample image for training the neural network. In the embodiments of the present disclosure, the image sample group includes two types of image samples. The first type of samples are image pairs formed by different images of a same object, and the second type of samples are image pairs formed by different images of different objects. That is, in the first type of samples, images in each image pair are different images of the same object, and in the second type of samples, images in each image pair are different images of different objects. Each image pair includes two images, such as the following first image and second image. In addition, in the embodiments of the present disclosure, the neural network is trained by using the two types of image samples.

Further, at least one image in the image sample group in the embodiments of the present disclosure has a corresponding identity, and the identity corresponds to an object in the image, and is used for recognizing an identity of a character object in the image. In the embodiments of the present disclosure, at least one image in the image sample group has a real classification label corresponding to an object corresponding to said image, and the real classification label is represented by a matrix. The accuracies of classification results of a neural network model are compared according to the real classification label, for example, a corresponding loss value is determined.

In some possible implementations, a manner of obtaining the image sample group includes: receiving, by using a communications component, an image sample group transmitted by another electronic device, for example, receiving an image sample group from a server, a mobile phone, or any computer device. At least one image in the image sample group is multiple image pairs obtained after performing coding processing on a video image collected by a camera, and is not limited specific limitation in the present disclosure.

After the image sample group is obtained, a specific optimization process of the neural network is performed. At step S200, first features and second features of the first image and the second image in each image pair are first recognized. The first feature includes an identity feature of the object in the image, such as a color, a shape, and an ornament feature of a dress. The second feature is a feature other than the first feature, for example, an attribute feature, and includes a pose feature, a background feature, and an environment feature of the character object. A manner of obtaining the first feature and the second feature is exemplified below.

Figure 2:
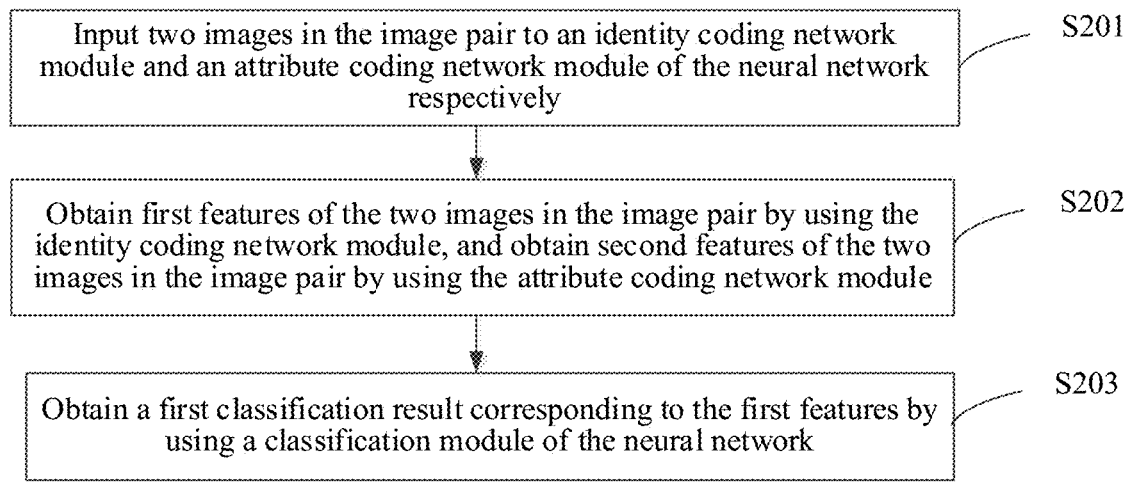
FIG. 2 is a flowchart of step S200 in a network optimization method according to embodiments of the present disclosure.

FIG. 2 is a flowchart of step S200 in a network optimization method according to embodiments of the present disclosure. Obtaining the first feature and the second feature of the image in the image sample group, and obtaining the first classification result by using the first feature of the image includes:

S201: inputting two images in the image pair to an identity coding network module and an attribute coding network module of the neural network;

S202: obtaining first features of the two images in the image pair by using the identity coding network module, and obtaining second features of the two images in the image pair by using the attribute coding network module; and S203: obtaining a first classification result corresponding to the first feature by using a classification module of the neural network.

The neural network in the embodiments of the present disclosure includes the identity coding network module and the attribute coding network module. The identity coding network module is configured to recognize an identity feature of an object in an image, and the attribute coding network module is configured to recognize an attribute feature of the object in the image. Therefore, at least one image pair in the obtained image sample group is respectively input into the identity coding network module and the attribute coding network module. The identity coding network module obtains the first features of the two images in the received image pair by means of the identity coding network module, and obtains the second features of the two images in the received image pair by means of the attribute coding network module. For example, if the two images in the input image pair are respectively represented by A and B, the first feature of A obtained by means of the identity coding network module is Au, the first feature of B obtained by means of the identity coding network module is Bu, the second feature of A obtained by means of the attribute coding network module is Av, and the second feature of B obtained by means of the attribute coding network module is Bv.

The identity coding network module may extract the first feature in the image by using a preset character feature extraction algorithm, or include module units such as a convolution module and a pooling module, to perform the obtaining of the first feature. The structure of the identity coding network module is not specifically limited in the embodiments of the present disclosure, and can be used as the identity coding network module in the embodiments of the present disclosure as long as it can extract the first feature in the image.

Similarly, the attribute coding network module may also extract the second feature in the image by using a preset pose and background feature algorithm, or include module units such as a convolution module. The structure of the attribute coding network module is not specifically limited in the embodiments of the present disclosure, and can be used as the attribute coding network module in the embodiments of the present disclosure as long as it can extract the second feature in the image.

After the first features and the second features of the two images in the image pair are extracted, in the embodiments of the present disclosure, an operation of performing classification recognition by using the first features is performed, and subsequent feature exchange processing is also performed.

The neural network in the embodiments of the present disclosure further includes a classification module. An output side of the identity coding network module is connected to an input side of the classification module, to receive the first feature output by the identity coding network module. The classification module obtains a first classification result according to the received first feature. The first classification result is used for indicating a prediction result of an identity corresponding to the first feature, and the prediction result is presented in the form of a matrix. An element of the matrix is a probability of predicting an object identity. The composition of the classification module in the embodiments of the present disclosure is voluntarily set, and the classification module can obtain the first classification result corresponding to the first feature by using a set classification principle, and can be used as the embodiments of the present disclosure as long as it can perform the classification of the first feature. After the first classification result is obtained, a first loss value corresponding to the first classification result is obtained, a loss value of the neural network is further determined according to the first loss value, and feedback adjustment are performed on parameters in the network.

In addition, after the first feature and the second feature of each image are obtained, feature exchange processing between every two images in the image pair is performed. As described in the foregoing embodiments, the feature exchange processing is exchanging the second feature of the first image and the second feature of the second image in the image pair, and obtaining a new image based on the first feature and the exchanged second feature.

Through feature exchange processing, the first feature of one image is combined with the second feature of the other image to form a new image, and classification is performed by using the new image, to effectively recognize a character identity based on the identity feature, thereby reducing the impact of attributes such as the background and the pose.

Figure 3:
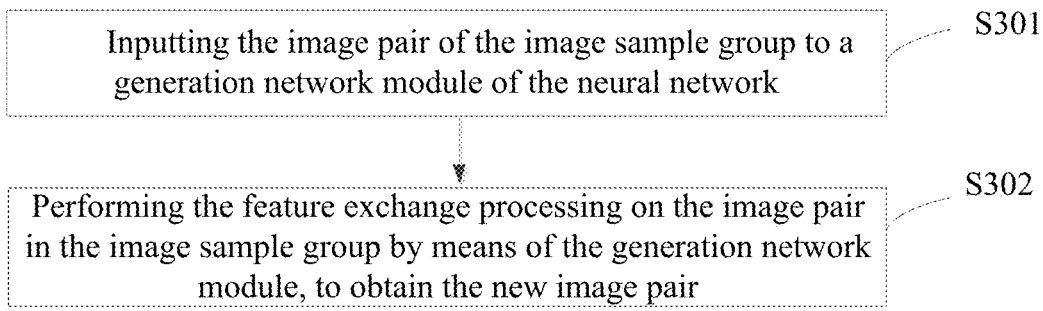
FIG. 3 is a flowchart of step S300 in a network optimization method according to embodiments of the present disclosure.

FIG. 3 is a flowchart of step S300 in an image processing method according to embodiments of the present disclosure. Performing feature exchange processing on the image pair in the image sample group to obtain the new image pair includes:

S301: inputting the image pair of the image sample group to a generation network module of the neural network; and S302: performing the feature exchange processing on the image pair in the image sample group by means of the generation network module, to obtain the new image pair.

The neural network in the embodiments of the present disclosure further includes the generation network module. The generation network module performs feature exchange processing on the first feature and the second feature that are obtained by the identity coding network module and the attribute coding network module, and obtains the new image according to the exchanged features. Specifically, as described in the foregoing embodiments, the image sample group input in the embodiments of the present disclosure includes two types of image sample groups. An image pair in a first type of sample is images of a same object. For the image pair in the first type of sample, the feature exchange processing is performed on the images in each image pair once in the embodiments of the present disclosure.

For the first type of sample, performing feature exchange processing on the images in the image sample group to obtain the new image pair includes: performing feature exchange processing on the images in the image pair once, to obtain the new image pair. This process includes:

generating a new first image by using the first feature of the first image and the second feature of the second image in the image pair, and generating a new second image by using the second feature of the first image and the first feature of the second image.

Because two images in the image pair in the first type of sample are different images of the same object, the new image obtained after the feature exchange processing is still an image of the same object. After the feature exchange processing is completed, the loss value of the neural network is determined by using a difference between the obtained new image and a corresponding original image as well as a difference between a first feature and a second feature of the new image and a first feature and a second feature of the corresponding original image, and recognition and classification are directly performed according to the generated new image. In this case, the generated new image pair is input to the classification module, and classification is performed to obtain a second classification result.

For example, the image pair in the first type of sample includes an image A and an image B, the first feature of A obtained by means of the identity coding network module is Au, the first feature of B obtained by means of the identity coding network module is Bu, the second feature of A obtained by means of the attribute coding network module is Av, and the second feature of B obtained by means of the attribute coding network module is By. A and B are respectively the first image and the second image of the same object, and the first image and the second image are different. During the feature exchange processing, a new first image A' is obtained by using the first feature Au of A and the second feature By of B, and a new second image B' is obtained by using the first feature Bu of B and the second feature Av of A.

As described above, the neural network in the embodiments of the present disclosure includes the generation network module, and the generation network module is configured to generate a new image based on the received first feature and the received second feature. For example, the generation network module includes at least one convolution unit, or includes other processing units, and an image corresponding to the first feature and the second feature is obtained by means of the generation network module. That is, a process of exchanging the second features and generating an image based on the exchanged features is completed by a generation network.

Through the foregoing feature exchange processing, a new image is formed by exchanging second features of two images, so that identity-related features and identity-independent features can be successfully separated. By training the neural network in this manner, recognition precision of the neural network for identity features can be improved.

In addition, the image sample group in the embodiments of the present disclosure further includes a second type of sample group, and an image pair in the second type of sample group includes images of different objects. For the image pair in the second type of sample, the feature exchange processing is performed on the images in each image pair twice in the embodiments of the present disclosure.

Figure 4:
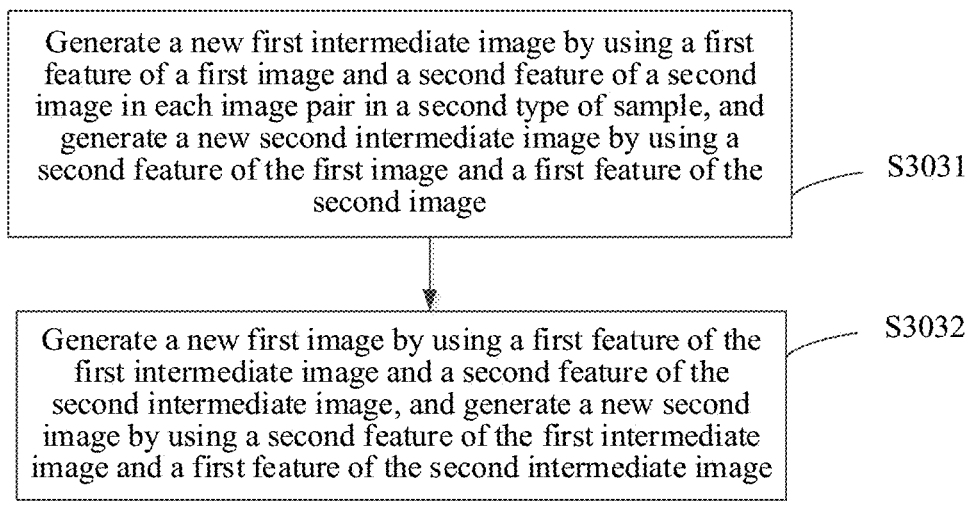
FIG. 4 is a flowchart of step S303 in a network optimization method according to embodiments of the present disclosure.

For the second type of sample group, FIG. 4 is a flowchart of step S303 of a network optimization method according to embodiments of the present disclosure. If the input image pair includes images of different objects, performing feature exchange processing on the image in the image sample group to obtain the new image pair includes: performing feature exchange processing on the image in the image pair twice, to obtain the new image pair. This process includes:

S3031: generating a first intermediate image by using the first feature of the first image and the second feature of the second image in the image pair, and generating a second intermediate image by using the second feature of the first image and the first feature of the second image; and S3032: generating a new first image by using a first feature of the first intermediate image and a second feature of the second intermediate image, and generating a new second image by using a second feature of the first intermediate image and a first feature of the second intermediate image.

For example, the first feature of A obtained by means of the identity coding network module is Au, the first feature of B obtained by means of the identity coding network module is Bu, the second feature of A obtained by means of the attribute coding network module is Av, and the second feature of B obtained by means of the attribute coding network module is Bv. A and B are respectively the first image and the second image of different objects. When the feature exchange processing is performed for the first time, a new first intermediate image A' is obtained by using the first feature Au of A and the second feature Bv of B, and a new second intermediate image B' is obtained by using the first feature Bu of B and the second feature Av of A. Correspondingly, when the feature exchange processing is performed for the second time, a first feature $A_u'$ and a second feature $A_v'$ of the first intermediate image A' as well as a first feature $B_u'$ and a second feature $B_v'$ of the second intermediate image B' are respectively obtained by using the identity coding network module and the attribute coding network module again. Exchange processing of the second feature $A_v'$ of the first intermediate image A' and the second feature $B_v'$ of the second intermediate image B' is further performed by using the generation network, a new first image A" is generated by using the first feature $A_u'$ of the first intermediate image A' and the second feature $B_v'$ of the second intermediate image B', and a new second image B" is generated by using the second feature $A_v'$ of the first intermediate image A' and the first feature $B_u'$ of the second intermediate image B'.

Through the above feature exchange processing performed twice, a new image is formed by exchanging second features of two images. The difference from the process of training the image pair of the same identity object lies in that: for the second type of sample, because there is no direct pixel-level supervision after the first feature exchange processing, the second feature exchange processing is performed, and an image corresponding to the original image is generated. This process may be a cyclic generation process.

After the feature exchange processing is completed, a difference between the obtained new image and a corresponding original image, and a difference between a first feature and a second feature of the new image and a first feature and a second feature of the corresponding original image are used. In addition, the first feature of the new image is also input to the classification module for classification processing to obtain the second classification result. For a case of the first type of sample, a second classification result of the first feature of the final new image is directly obtained. For a case of the second type of sample, in addition to the second classification result of the first feature of the final new image, a second classification result of the first feature of the intermediate image is also obtained. In the embodiments of the present disclosure, the neural network is optimized according to the second classification result, a difference between the new image and the original image, and a difference between the features. That is, in the embodiments of the present disclosure, feedback adjustment is performed on the neural network according to a loss value of an output result obtained by each network module of the neural network, until the loss value of the neural network meets a preset requirement. If the loss value is less than a loss threshold, it is determined that the preset requirement is met. A loss function of the neural network in the embodiments of the present disclosure is related to loss functions of network modules, for example, is a weighted sum of the loss functions of multiple network modules. Based on this, the loss value of the neural network is obtained by using the loss value of each network module, whereby adjusting parameters of each network module of the neural network until the preset requirement that the loss value is less than the loss threshold is met, and the loss threshold is set according to the requirements of a person skilled in the art. No specific limitation is made thereto in the present disclosure.

Hereinafter, the feedback adjustment process in the embodiments of the present disclosure is described in detail.

Figure 5:
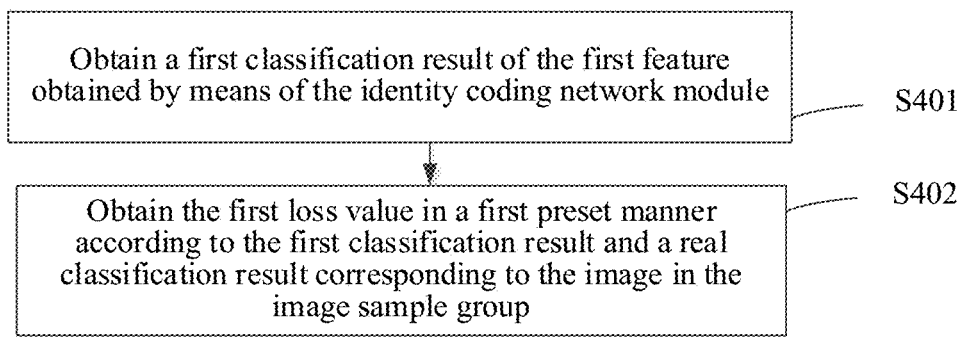
FIG. 5 is a flowchart of step S400 in an image processing method according to embodiments of the present disclosure.

After the first feature of the image is obtained by means of the identity coding network module, the classification module obtains the first classification result according to the first feature. In the embodiments of the present disclosure, a first loss value of the first classification result obtained by using the first feature obtained by means of the identity coding network module is obtained in a first preset manner. FIG. 5 is a flowchart of step S400 in an image processing method according to embodiments of the present disclosure. The process of obtaining the first loss value includes:

S401: obtaining the first classification result of the first feature by means of the identity coding network module; and S402: obtaining the first loss value in a first preset manner according to the first classification result and a real classification result corresponding to the image in the image sample group.

As described in the foregoing embodiments, at step S200, when the first feature of the image in the sample is obtained, classification recognition of the first feature is performed by means of the classification module, to obtain the first classification result corresponding to the first feature. The first classification result is represented in the form of a matrix, and each element in the matrix is represented as a probability corresponding to each identity label. A first difference is obtained by comparing the first classification result with a real classification result, and the first difference is determined as the first loss value in the embodiments of the present disclosure. Alternatively, in other embodiments, the first classification result and the real classification result are input into a first loss function of the classification module to obtain the first loss value. No specific limitation is made thereto in the present disclosure.

In the embodiments of the present disclosure, when training the neural network by means the first type of sample and by means of the second type of sample, the loss functions used may be the same or different. In addition, in the embodiments of the present disclosure, summation processing is performed on the loss value of the neural network obtained by training through the first type of sample and the loss value of the neural network obtained by training through the second type of sample, to obtain a final loss value of the neural network, and feedback adjustment processing is performed on the network by using the loss value, where in the feedback adjustment process, the parameters of each network module of the neural network are adjusted, or only the parameters of some of the network modules are adjusted. No specific limitation is made thereto in the present disclosure.

First, in the embodiments of the present disclosure, the first loss value of the first classification result obtained by using the first feature obtained by means of the identity coding network module is obtained in the first preset manner. The expression of the first preset manner is as presented by formula (1).

$$L_c = -\Sigma_{i=1}^N L \odot \log(C(I)) \qquad \text{Formula (1)}$$

where $\odot$ represents element multiplication, $C(I)$ represents an N-dimensional prediction feature vector corresponding to the first classification result, L is an N-dimensional feature vector corresponding to a real label of a corresponding original image (a real classification result), $L_c$ is a first loss value corresponding to the first loss function, and i is a variable greater than or equal to 1 and less than or equal to N.

The first loss value of the first classification result obtained by the classification module may be obtained in the foregoing manner. In the embodiments of the present disclosure, feedback adjustment is performed on parameters of the identity coding network module, the attribute coding network module, and the classification module according to the first loss value, or an overall loss value of the neural network is determined according to the first loss value and the loss values of other network modules, and unified feedback adjustment is performed on at least one network module of the neural network. No limitation is made thereto in the present disclosure.

Secondly, in the embodiments of the present disclosure, processing is also performed on the new image pair generated by the generation network module, to obtain a second loss value of the new image pair and a third loss value of a corresponding feature. The manner of determining the second loss value includes: obtaining, in the second preset manner, a second loss value of the new image pair obtained by means of the network generation module relative to an original image pair.

In the embodiments of the present disclosure, the new image pair is obtained by means of the generation network. In the embodiments of the present disclosure, the second loss value is determined according to a difference between the new image pair and the original image pair.

For the first type of sample, the expression of the second preset manner is as represented by formula (2):

$$L_{ir} = -\|\hat{X}_v - X_v\|_1 + \|\hat{X}_u - X_u\|_1 \qquad \text{Formula (2)}$$

where $X_u$ and $X_v$ are respectively a first image and a second image in the original image pair, $\hat{X}_u$ and $\hat{X}_v$ are respectively a new first image and a new second image in the new image pair, $L_{ir}$ is a second loss value corresponding to a second loss function, and $\|\ \|_1$ denotes a norm 1.

The second loss value corresponding to the new image pair generated by the generation network module for the first type of sample is obtained in the foregoing manner.

For the second type of sample, the expression of the second preset manner is as represented by formula (3):

$$L_{cr} = \|\tilde{X}_u - X_u\|_1 + \|\tilde{Y}_w - X_w\|_1 \qquad \text{Formula (3)}$$

where $X_u$ is the first image in the original image pair, $\tilde{X}_u$ is the first image in the new image pair, Yw is the second image in the original image pair, and $\tilde{Y}_w$ is the second image in the new image pair.

In addition, in the embodiments of the present disclosure, a third loss value corresponding to a feature of the new second image pair is further obtained, and the third loss value is obtained in a third preset manner.

The expression of the third preset manner is as represented by formula (4):

$$L_s = -\frac{I_{Xu}^T I_{\hat{X}u}}{\|I_{Xu}\|_2 \|I_{\hat{X}u}\|_2} - \frac{I_{Xv}^T I_{\hat{X}v}}{\|I_{Xv}\|_2 \|I_{\hat{X}v}\|_2} \qquad \text{Formula (4)}$$

where $I_{Xu}$ represents a first feature of the first image $X_u$ in the original image pair, $I_{\hat{X}u}$ represents a first feature of the new first image $\hat{X}_u$, $I_{Xv}$ represents a second feature of the second image $X_v$ in the original image pair, $I_{\hat{X}v}$ is a second feature of the new second image $\hat{X}_v$, T is a transposition operation, $L_s$ is a loss value corresponding to the third loss function, and $\|\ \|_2$ represents a norm 2.

In the foregoing manner, the classification module obtains the third loss value corresponding to the feature of the new image pair generated by the generation network module.

Similarly, in the embodiments of the present disclosure, feedback adjustment may be performed on the parameters of the network generation module respectively according to the second loss value and the third loss value, and feedback adjustment may also be performed on the multiple network modules of the neural network simultaneously. For example, in some possible implementations of the present disclosure, the loss value of the neural network is obtained by using a weighted sum of the first loss value, the second loss value, and the third loss value. That is, the loss function of the neural network is the weighted sum of the first loss function, the second loss function, and the third loss function. The weight of each loss function is not specifically limited in the present disclosure, and can be set by a person skilled in the art according to requirements. If the obtained loss value is greater than the loss threshold, feedback adjustment is performed on the parameters of the multiple network modules. The training is terminated when the loss value is less than the loss threshold. In this case, neural network optimization is completed. In addition, in the embodiments of the present disclosure, the first loss function, the second loss function, and the third loss function during training based on the image pair of the first type of sample may be different from the first loss function, the second loss function, and the third loss function during training based on the image pair of the second type of sample-, but this is not a specific limitation in the present disclosure.

In addition, to enhance the training precision of the neural network in the embodiments of the present disclosure, the neural network in the embodiments of the present disclosure further includes a discrimination network module. The discrimination network module is configured to determine reality (a label feature of reality) of the generated new image pair, and a fourth loss value corresponding to the generated new image pair determined by the discrimination network module is obtained according to the reality. A discrimination network and the generation network in the embodiments of the present disclosure constitute a generative adversarial network. For the specific structure of the generative adversarial network, a person skilled in the art could select a proper structure for configuration according to the existing technical means. No specific limitation is made thereto in the present disclosure. In the embodiments of the present disclosure, the generated new image pair is input to the discrimination network module of the neural network, and the fourth loss value of the new image pair is obtained in a fourth preset manner.

The expression of the fourth preset manner is as represented by formula (5):

$$L_{adv} = -(E[\log D(X)] + E[\log(1 - D(\hat{X}))]) \qquad \text{Formula (5)}$$

where D represents a model function of the discrimination network module, E[ ] represents an expectation, X represents an original image corresponding to a new image, i.e., a real image, $\hat{X}$ represents the new image input to the discrimination network module, D(X) represents a label feature of the discrimination network module for the real image, and D($\hat{X}$) represents a label feature of the discrimination network module for the input new image. An element in D($\hat{X}$) is a value from 0 to 1. The closer the value is to 1, the higher the reality of the element is.

In the embodiments of the present disclosure, the training process of the discrimination network module may be performed separately, that is, the generated new image and the corresponding real image are input to the discrimination network module, and the discrimination network module is trained based on the fourth loss function until the loss value corresponding to the fourth loss function is lower than a loss threshold required for training.

In other possible embodiments, the discrimination network module may also be trained simultaneously with the identity coding network module, the attribute coding network module, and the generation network module. Accordingly, in step S400 of the embodiments of the present disclosure, the loss value of the neural network may also be obtained by using the first loss value, the second loss value, the third loss value, and the fourth loss value. That is, the loss function of the neural network is a weighted sum of the first loss function, the second loss function, the third loss function, and the fourth loss function; the weight of each loss function is not specifically limited in the present disclosure, and can be set by a person skilled in the art according to requirements. If the obtained loss value is greater than the loss threshold, feedback adjustment is performed on the parameters of multiple network modules of the neural network. The training is terminated when the loss value is less than the loss threshold. In this case, neural network optimization is completed.

In addition, in the embodiments of the present disclosure, the first loss function, the second loss function, and the third loss function during training based on the image pair of the first type of sample may be different from the first loss function, the second loss function, and the third loss function during training based on the image pair of the second type of sample, but this is not a specific limitation in the present disclosure.

In some possible embodiments of the present disclosure, if the image sample group input to the identity coding network module and the attribute coding network module is an image pair of a same object (the first type of sample), a first network loss value of the neural network is obtained in a fifth preset manner based on the first loss value, the second loss value, the third loss value, and the fourth loss value. The expression of the fifth preset manner is as represented by formula (6):

$$L_{intra}=L_c+\lambda_{ir}L_{ir}+\lambda_s L_s+\lambda_{adv}L_{adv} \quad \text{Formula (6)}$$

where $\lambda_{ir}$, $\lambda_s$, and $\lambda_{adv}$ are weights of the second loss function, the third loss function, and the fourth loss function respectively, and Lintra is the first network loss value.

If the image sample group input to the neural network and the attribute coding network module is an image pair of different objects, a second network loss value of the neural network is obtained in a sixth preset manner based on the first loss value, the second loss value, the third loss value, and the fourth loss value. The expression of the sixth preset manner is as represented by formula (7):

$$L_{inter}=L_c+\lambda_{cr}L_{cr}+\lambda_s L_s+\lambda_{adv}L_{adv} \quad (7)$$

where $\lambda_{cr}$, $\lambda_s$, and $\lambda_{adv}$ are weights of the second loss function, the third loss function, and the fourth loss function respectively, and Linter is the second network loss value.

In the embodiments of the present disclosure, the loss value of the neural network is obtained according to a sum result of the first network loss value and the second network loss value. That is, the loss value of the neural network is L=Lintra+Linter. In the training process, if the obtained loss value is greater than the loss threshold, feedback adjustment is performed on the parameters of the neural network, for example, feedback adjustment is performed on the parameters of the multiple network modules (the identity coding network module, the attribute coding network module, the generation network module, and the discrimination network module, etc.). The training is terminated when the loss value of the neural network is less than the loss threshold. In this case, neural network optimization is completed. Alternatively, in other embodiments, the parameters of the identity coding network module, the attribute coding network module, and the classification module may also be adjusted according to the first loss value, the parameters of the generation network module are adjusted according to the second loss value and the third loss value, and the parameters of the discrimination network modules are adjusted according to the fourth loss value. The training is terminated when the loss value is less than the loss threshold of the corresponding loss function. That is, in the embodiments of the present disclosure, feedback adjustment and training may be performed separately on any one of the network modules, and unified adjustment may also be performed on some or all network modules of the neural network through the loss value of the neural network. A person skilled in the art could select an appropriate manner according to requirements to perform this adjustment process.

In addition, in the embodiments of the present disclosure, to improve the recognition precision of the identity features of the neural network, it is also possible to add noise to the image before inputting the image sample group to the identity coding network module, for example, adding noise to an image areas of objects in the two images in the image pair. In the embodiments of the present disclosure, the noise is added by adding a coverage layer to a part of an image area of a character object, and the size of the coverage layer can be set a person skilled in the art according to requirements, and is not limited in the present disclosure. It should be noted herein that, in the embodiments of the present disclosure, noise is only added to the image input to the identity coding network module, and no noise is introduced into other network modules. In this manner, the precision of identity recognition of the neural network is effectively improved.

To describe the embodiments of the present disclosure more clearly, training processes of the first type of sample and the second type of sample are described below by means of examples.

Figure 6:
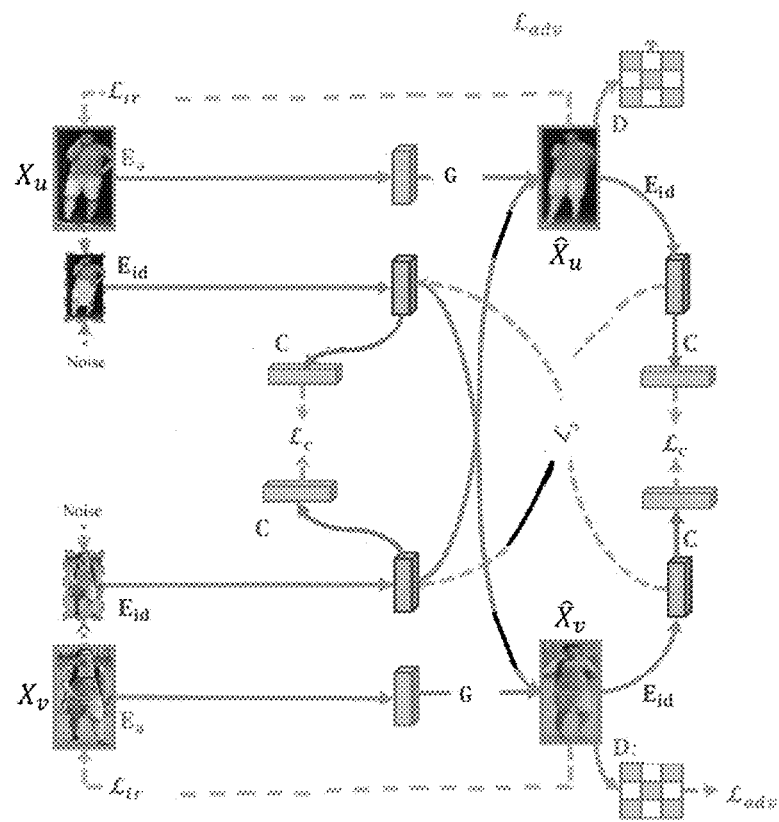
FIG. 6 is a schematic diagram of a process of performing network optimization processing by using a first type of sample according to embodiments of the present disclosure.

FIG. 6 is a schematic diagram of a process of performing network optimization processing by using a first type of sample according to embodiments of the present disclosure. Two images Xu and Xv of a same object are input to an identity coding network Eid to obtain a first feature, the image Xu and Xv are input to an attribute coding network Ea to obtain a second feature, and the first feature is input to a classifier C to obtain a first classification result and a first loss value Lc. Noise is added to the image input to the identity coding network Eid, for example, a coverage map is added to a part of an area of a character object, to block a partial area.

The second features in the image pair are exchanged, and two new images after the exchange processing are obtained by using the generation network module G. In this case, a second loss value Lir corresponding to the two new images and a third loss value Ls corresponding to the first feature and the second feature corresponding to the two new images are obtained, and the new image is input to the discrimination network module D to obtain a fourth loss value Lady. In this case, the loss value of the neural network is obtained by using the first loss value Lc, the second loss value Lir, the third loss value Ls, and the fourth loss value Lady. If the loss value is less than the loss threshold, the training is terminated. Otherwise, feedback adjustment is performed on the parameters of at least one network module of the neural network.

Figure 7:
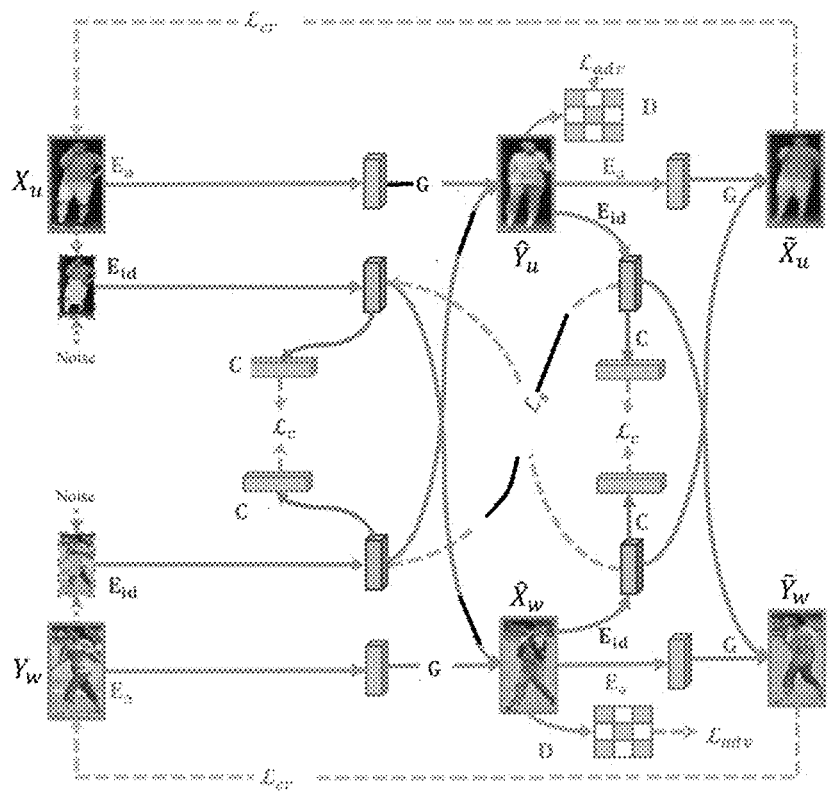
FIG. 7 is a schematic diagram of a process of performing network optimization processing by using a second type of sample according to embodiments of the present disclosure.

FIG. 7 is a schematic diagram of a process of performing network optimization processing by using a second type of sample according to embodiments of the present disclosure. Two images Xu and Xw of different objects are input to an identity coding network Eid to obtain a first feature, the image Xu and Xw are input to an attribute coding network Ea to obtain a second feature, and the first feature is input to a classifier C to obtain a first classification result and a first loss value Lc. Noise is added to the image input to the identity coding network Eid, for example, a coverage map is added to a part of an area of a character object, to block a partial area.

The second features in the image pair are exchanged, and two intermediate images after the exchange processing are obtained by using a generator, and first features and second features of the two intermediate images are further obtained by using the identity coding network module Eid and the attribute coding network module Ea, and then the second features of the intermediate images are exchanged to obtain a new image. In this case, second loss values Ls corresponding to the two new images and third loss values Lcr corresponding to first features and second features corresponding to the two new images are obtained, and the intermediate images or the new images are input to the discrimination network module D to obtain a fourth loss value Lady. In this case, the loss value of the neural network is obtained by using the first loss value, the second loss value, the third loss value, and the fourth loss value. If the loss value is less than the loss threshold, the training is terminated. Otherwise, feedback adjustment is performed on the parameters of at least one network module of the neural network.

In the embodiments of the present disclosure, a first feature (identity feature) and a second feature other than the first feature in an input image are effectively extracted, and second features of two images are exchanged to form a new picture, so that identity-related features and identity-independent features are successfully separated, where the identity-related features may be effectively used for pedestrian re-identification. In the embodiments of the present disclosure, no auxiliary information other than an image data set is required in a training stage and an application stage, sufficient generation supervision is provided, and recognition precision is effectively improved.

A person skilled in the art could understand that, in the foregoing method in the detailed description, the writing sequence of the steps does not mean a strict execution sequence, and does not constitute any limitation on the implementation process. The specific execution sequence of the steps should be determined based on functions and possible internal logic of the steps.

In addition, the embodiments of the present disclosure further provide an image processing method. The method is applied to the neural network obtained through the image optimization method provided in the first aspect to perform operations of image recognition, to obtain a recognition result corresponding to the identity of the input image.

Figure 8:
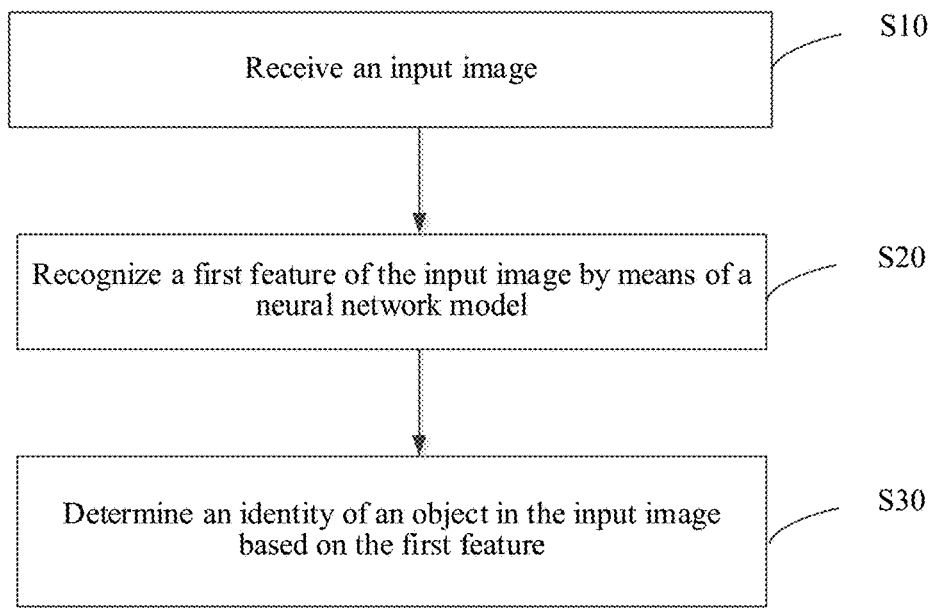
FIG. 8 is a flowchart of an imaging processing method according to embodiments of the present disclosure.

FIG. 8 is a flowchart of an imaging processing method according to embodiments of the present disclosure. The method includes:

S10: receiving an input image;

S20: recognizing a first feature of the input image by means of a neural network model; and S30: determining an identity of an object in the input image based on the first feature, where the neural network model is a network model obtained after optimization processing through the network optimization method according to any item in the first aspect.

In the embodiments of the present disclosure, a neural network model that meets requirements is obtained through training according to the first aspect, and an operation of recognizing an object in an image is performed by using the neural network model. That is, an image processing apparatus capable of performing operations such as image recognition is formed by using the neural network model, and the apparatus is configured to perform the foregoing identity recognition process.

In the embodiments of the present disclosure, a database is included. The database includes information about multiple person objects, such as images of the person objects and corresponding identity information, such as information about names, ages, and occupations. No limitation is made thereto in the present disclosure.

After the input image is received, in the embodiments of the present disclosure, the first feature of the received input image is compared with the images of the person objects in the database to determine a person object that matches the received input image in the database. The neural network model in the embodiments of the present disclosure is trained in the foregoing embodiments, and meets the precision requirements. Therefore, in the embodiments of the present disclosure, the object that matches the input image can be precisely determined, and then identity information corresponding to the object is obtained.

The image processing method in the embodiments of the present disclosure can be used to quickly recognize the identity of an image object, and can improve the recognition precision.

It can be understood that the foregoing method embodiments mentioned in the present disclosure can be combined with each other to form combined embodiments without departing from principle logic. Details are not described in the present disclosure repeatedly due to space limitation.

In addition, the present disclosure further provides an image processing apparatus, an electronic device, a computer-readable storage medium, and a program, which are all configured to implement any image processing method provided in the present disclosure. For corresponding technical solutions and descriptions, refer to corresponding descriptions of the method part. Details are not described again.

Figure 9:
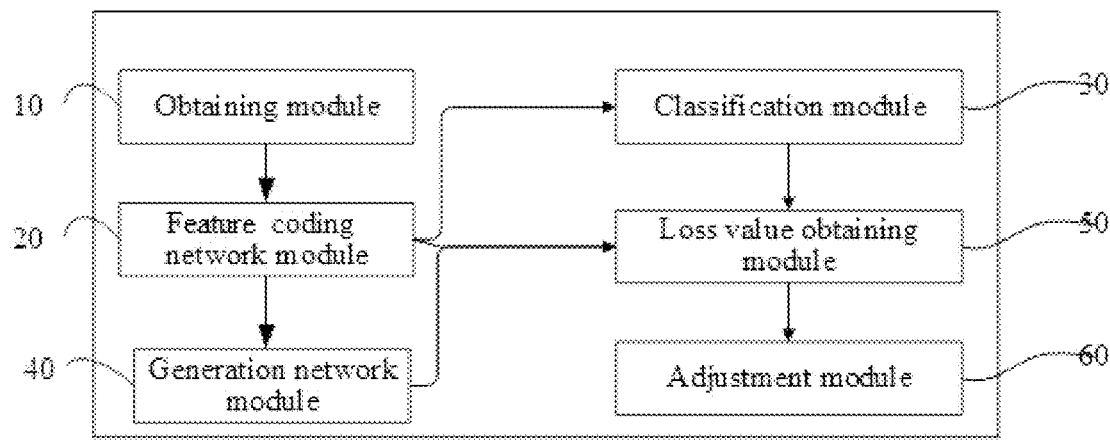
FIG. 9 is a block diagram of a network optimization apparatus according to embodiments of the present disclosure.

FIG. 9 is a block diagram of a network optimization apparatus according to embodiments of the present disclosure. As shown in FIG. 9, the network optimization apparatus includes:

an obtaining module 10, configured to obtain an image sample group, where the image sample group includes an image pair formed by images of a same object and an image pair formed by images of different objects; a feature coding network module 20, configured to obtain a first feature and a second feature of an image in the image sample group; a classification module 30, configured to obtain a first classification result according to the first feature of the image; a generation network module 40, configured to perform feature exchange processing on the image pair in the image sample group to obtain a new image pair, where the feature exchange processing is to generate a new first image by using a first feature of a first image and a second feature of a second image in the image pair, and to generate a new second image by using a second feature of the first image and a first feature of the second image; a loss value obtaining module 50, configured to obtain a first loss value of the first classification result, a second loss value of the new image pair, and a third loss value of first features and second features of the new image pair in a preset manner; and an adjustment module 60, configured to adjust parameters of the neural network at least according to the first loss value, the second loss value, and the third loss value until a preset requirement is met.

In some possible implementations, the feature coding network module includes an identity coding network module and an attribute coding network module, where the obtaining module is further configured to input two images in the image pair to the identity coding network module and the attribute coding network module; and the identity coding network module is configured to: obtain first features of the two images in the image pair by using the identity coding network module, and obtain second features of the two images in the image pair by using the attribute coding network module.

In some possible implementations, the loss value obtaining module is further configured to: obtain the first classification result of the first features obtained by means of the identity coding network module; and obtain the first loss value in a first preset manner according to the first classification result and a real classification result corresponding to the image in the image sample group.

In some possible implementations, the apparatus further includes: a preprocessing module, configured to add noise to image areas of objects in the two images in the image pair before inputting the two images in the image pair to the identity coding network module.

In some possible implementations, the generation network module is further configured to: if an input image pair includes images of a same object, perform feature exchange processing on the images in the image pair once, to obtain the new image pair; and generate a new first image by using the first feature of the first image and the second feature of the second image in the image pair, and generate a new second image by using the second feature of the first image and the first feature of the second image.

In some possible implementations, the generation network module is further configured to: if the input image pair are images of different objects, perform feature exchange processing on the images in the image pair twice, to obtain the new image pair; and generate a first intermediate image by using the first feature of the first image and the second feature of the second image in the image pair, and generate a second intermediate image by using the second feature of the first image and the first feature of the second image; and generate a new first image by using a first feature of the first intermediate image and a second feature of the second intermediate image, and generate a new second image by using a second feature of the first intermediate image and a first feature of the second intermediate image.

In some possible implementations, the loss value obtaining module is further configured to obtain, in a second preset manner, the second loss value of the new image pair obtained by means of the network generation module relative to an original image pair, where the original image pair corresponds to the new image pair.

In some possible implementations, the loss value obtaining module is further configured to obtain the third loss value of the first features and the second features of the new image pair in a third preset manner based on the first features and the second features of the new image pair as well as first features and second features of the corresponding original image pair, where the original image pair corresponds to the new image pair.

In some possible implementations, the apparatus further includes: a discrimination network module, configured to: receive the new image pair, and obtain a label feature representing reality of the new image pair; and the loss value obtaining module is further configured to obtain a fourth loss value of the new image pair in a fourth preset manner based on the label feature.

In some possible implementations, the adjustment module is further configured to: obtain the loss value of the neural network by using the first loss value, the second loss value, the third loss value, and the fourth loss value; and adjust the parameters of the neural network by using the loss value of the neural network until the preset requirement is met.

In some possible implementations, the adjustment module is further configured to: if the image sample group input to the neural network is the image pair of the same object, obtain a first network loss value of the neural network in a fifth preset manner based on the first loss value, the second loss value, the third loss value, and the fourth loss value; if the image sample group input to the neural network is the image pair of different objects, obtain a second network loss value of the neural network in a sixth preset manner based on the first loss value, the second loss value, the third loss value, and the fourth loss value; and obtain the loss value of the neural network based on a sum result of the first network loss value and the second network loss value.

Figure 10:
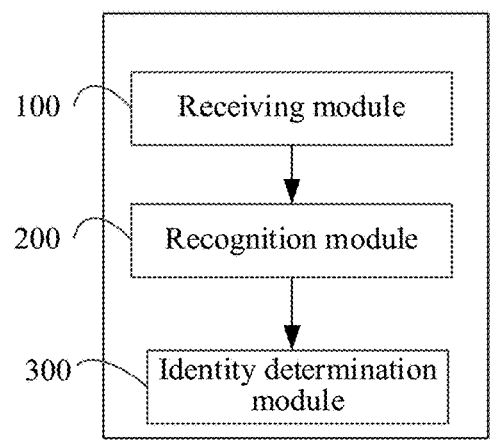
FIG. 10 is a block diagram of an image processing apparatus according to embodiments of the present disclosure.

FIG. 10 is a block diagram of an image processing apparatus according to embodiments of the present disclosure. As shown in the figure, the image processing apparatus includes:

a receiving module 100, configured to receive an input image;

a recognition module 200, configured to recognize a first feature of the input image by means of a neural network model; and an identity determination module 300, configured to determine an identity of an object in the input image based on the first feature.

The neural network model is a network model obtained after optimization processing through the network optimization method according to any one of the first aspect.

In some embodiments, the functions of or modules included in the apparatus provided in the embodiments of the present disclosure are configured to perform the methods described in the foregoing method embodiments. For specific implementations of the methods, refer to the descriptions of the foregoing method embodiments. For brevity, details are not described herein again.

The embodiments of the present disclosure further provide a computer-readable storage medium, having computer program instructions stored thereon, where the computer program instructions are executed by a processor to implement the foregoing methods. The computer-readable storage medium may be a non-volatile computer-readable storage medium.

The embodiments of the present disclosure further provide an electronic device, including: a processor; and a memory configured to store processor-executable instructions; where the processor is configured to implement the foregoing methods.

The embodiments of the present disclosure provide a computer program product, including a computer-readable code, where when the computer-readable code runs on a device, a processor in the device executes instructions for implementing the method provided in any one of the foregoing embodiments.

The electronic device may be provided as a terminal, a server, or other forms of devices.

Figure 11:
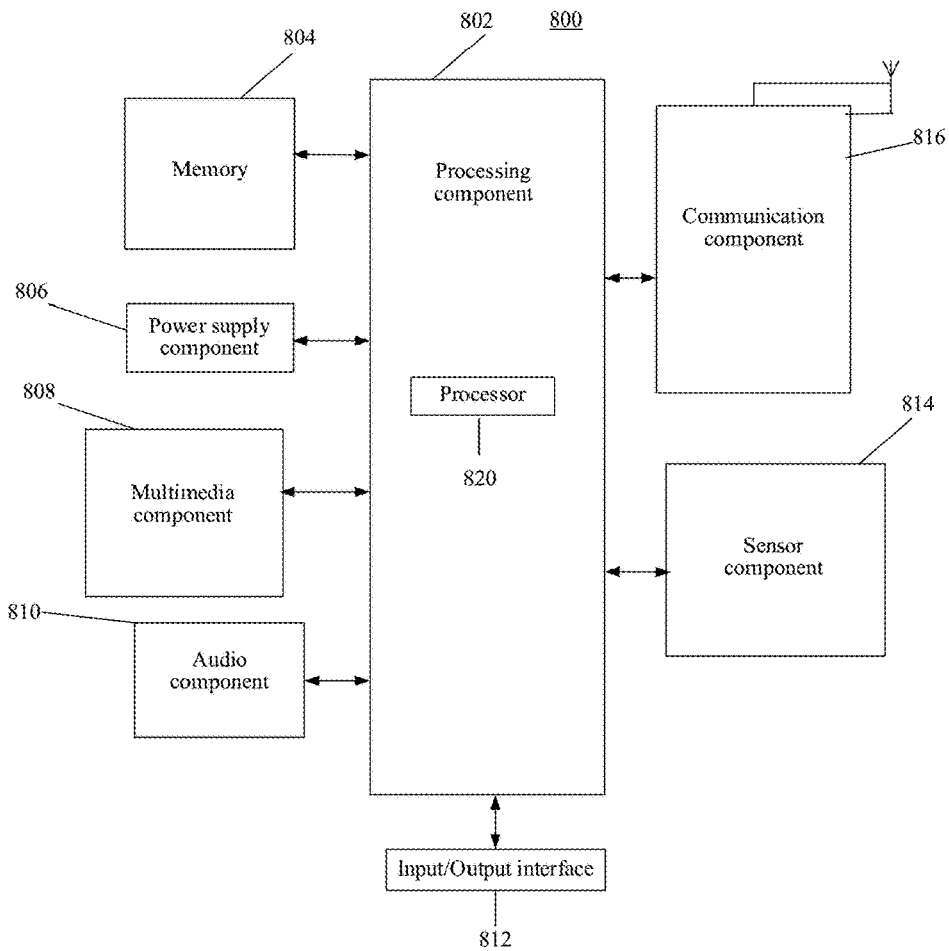
FIG. 11 is a block diagram of an electronic device 800 according to embodiments of the present disclosure.

FIG. 11 is a block diagram of an electronic device 800 according to embodiments of the present disclosure. For example, the electronic device 800 may be a terminal such as a mobile phone, a computer, a digital broadcast terminal, a message transceiver device, a game console, a tablet device, a medical device, exercise equipment, and a personal digital assistant.

Referring to FIG. 11, the electronic device 800 may include one or more of the following components: a processing component 802, a memory 804, a power supply component 806, a multimedia component 808, an audio component 810, an Input/Output (I/O) interface 812, a sensor component 814, and a communication component 816.

The processing component 802 generally controls overall operation of the electronic device 800, such as operations associated with display, phone calls, data communications, camera operations, and recording operations. The processing component 802 may include one or more processors 820 to execute instructions to implement all or some of the steps of the method above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any application or method operated on the electronic device 800, contact data, contact list data, messages, pictures, videos, and etc. The memory 804 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk.

The power supply component 806 provides power for various components of the electronic device 800. The power supply component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the electronic device 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. The button may include, but is not limited to, a home button, a volume button, a start button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect a position change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the electronic device 800 and other devices. The electronic device 800 may access a wireless network based on a communication standard, such as WiFi, 2G, or 3G, or a combination thereof. In an exemplary embodiment, the communication component 816 receives a broadcast signal or broadcast-related information from an external broadcast management system by means of a broadcast channel. In an exemplary embodiment, the communication component 816 further includes a Near Field Communication (NFC) module to facilitate short-range communication. For example, the NFC module may be implemented based on Radio Frequency Identification (RFID) technology, Infrared Data Association (IrDA) technology, Ultra-Wideband (UWB) technology, Bluetooth (BT) technology, and other technologies.

In an exemplary embodiment, the electronic device 800 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the method above.

In an exemplary embodiment, a non-volatile computer-readable storage medium is further provided, for example, a memory 804 including computer program instructions, which can executed by the processor 820 of the electronic device 800 to implement the methods above.

Figure 12:
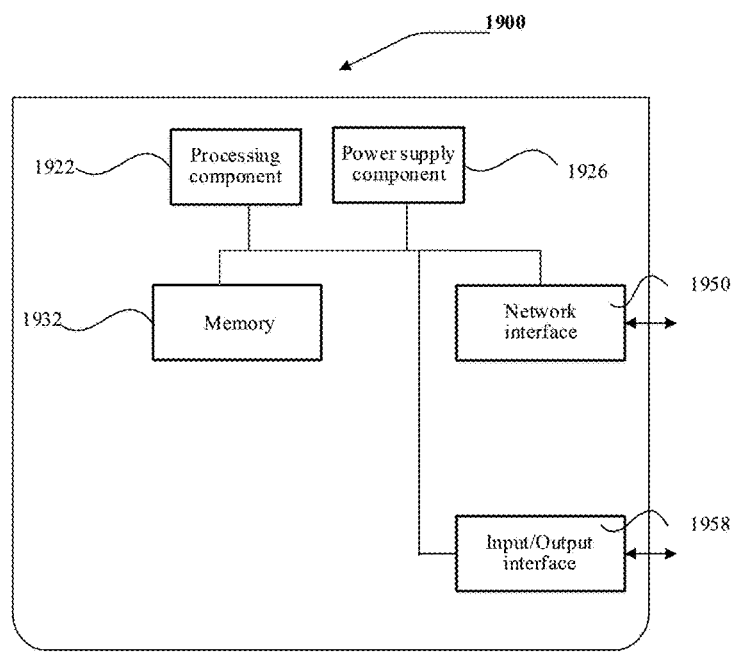
FIG. 12 is a block diagram of an electronic device 1900 according to embodiments of the present disclosure.

FIG. 12 is a block diagram of an electronic device 1900 according to an exemplary embodiment. For example, the electronic device 1900 may be provided as a server. Referring to FIG. 12, the electronic device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. Further, the processing component 1922 may be configured to execute instructions so as to execute the above method.

The electronic device 1900 may further include a power supply component 1926 configured to execute power management of the electronic device 1900, a wired or wireless network interface 1950 configured to connect the electronic device 1900 to the network, and an I/O interface 1958. The electronic device 1900 may be operated based on an operating system stored in the memory 1932, such as Windows Server™, Mac OS X™, Unix™, Linux™, FreeBSD™ or the like.

In an exemplary embodiment, a non-volatile computer-readable storage medium is further provided, for example, a memory 1932 including computer program instructions, which can executed by the processing component 1922 of the electronic device 1900 to implement the method above.

The present disclosure may be a system, a method, and/or a computer program product. The computer program product may include a computer-readable storage medium, on which computer-readable program instructions used by the processor to implement various aspects of the present disclosure are stored.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage medium include: a portable computer diskette, a hard disk, a Random Access Memory (RAM), an ROM, an EPROM (or a flash memory), a SRAM, a portable Compact Disk Read-Only Memory (CD-ROM), a Digital Versatile Disc (DVD), a memory stick, a floppy disk, a mechanically encoded device such as punch-cards or raised structure in a groove having instructions stored thereon, and any suitable combination thereof. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a Local Area Network (LAN), a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In a scenario involving a remote computer, the remote computer may be connected to the user's computer through any type of network, including a LAN or a Wide Area Network (WAN), or the connection may be made to an external computer (for example, through the Internet using an Internet service provider). In some embodiments, an electronic circuit such as a programmable logic circuit, an FPGA, or a Programmable Logic Array (PLA) is personalized by using status information of the computer readable program instructions, and the electronic circuit may execute the computer readable program instructions to implement various aspects of the present disclosure.

Various aspects of the present disclosure are described here with reference to the flowcharts and/or block diagrams of the methods, apparatuses (systems), and computer program products according to the embodiments of the present disclosure. It should be understood that each block of the flowcharts and/or block diagrams, and combinations of the blocks in the flowcharts and/or block diagrams can be implemented by computer-readable program instructions.

These computer-readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can cause a computer, a programmable data processing apparatus, and/or other devices to function in a particular manner, such that the computer-readable medium having instructions stored therein includes an article of manufacture instructing instructions which implement the aspects of the functions/acts specified in one or more blocks of the flowcharts and/or block diagrams.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus or other device implement the functions/acts specified in one or more blocks of the flowcharts and/or block diagrams.

The flowcharts and block diagrams in the accompanying drawings show architectures, functions, and operations that may be implemented by the systems, methods, and computer program products in the embodiments of the present disclosure. In this regard, each block in the flowchart of block diagrams may represent a module, segment, or portion of instruction, which includes one or more executable instructions for implementing the specified logical function(s). In some alternative implementations, the functions noted in the block may also occur out of the order noted in the accompanying drawings. For example, two blocks shown in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts, can be implemented by special purpose hardware-based systems that perform the specified functions or acts or carried out by combinations of special purpose hardware and computer instructions.

The embodiments of the present disclosure are described above. The foregoing descriptions are exemplary but not exhaustive, and are not limited to the embodiments of the disclosure. Many modifications and variations will be apparent to persons of ordinary skill in the art without departing from the scope and spirit of the described embodiments. The terms used herein are intended to best explain the principles of the embodiments, practical applications, or technical improvements to the technologies in the market, or to enable other persons of ordinary skill in the art to understand the embodiments disclosed herein.

The invention claimed is:

1. A network optimization method for optimizing a neural network, comprising:
    obtaining an image sample group, wherein the image sample group comprises an image pair formed by images of a same object and an image pair formed by images of different objects;
    obtaining a first feature and a second feature of an image in the image sample group, and obtaining a first classification result by using the first feature of the image, wherein the first feature comprises an identity feature, and the second feature comprises an attribute feature;
    performing feature exchange processing on an image pair in the image sample group to obtain a new image pair, wherein the feature exchange processing is to generate a new first image by using a first feature of a first image and a second feature of a second image in the image pair, and to generate a new second image by using a second feature of the first image and a first feature of the second image;
    obtaining a first loss value of the first classification result, a second loss value of the new image pair, and a third loss value of first features and second features of the new image pair in a preset manner; and
    adjusting parameters of the neural network at least according to the first loss value, the second loss value, and the third loss value until a preset requirement is met.

2. The method according to claim 1, wherein obtaining the first feature and the second feature of the image in the image sample group comprises:
    inputting two images in the image pair to an identity coding network module and an attribute coding network module of the neural network; and
    obtaining first features of the two images in the image pair by using the identity coding network module, and obtaining second features of the two images in the image pair by using the attribute coding network module.

3. The method according to claim 2, wherein obtaining the first loss value of the first classification result, the second loss value of the new image pair, and the third loss value of the first features and the second features of the new image pair in the preset manner comprises:
    obtaining the first classification result of the first features obtained by means of the identity coding network module; and
    obtaining the first loss value in a first preset manner according to the first classification result and a real classification result corresponding to the image in the image sample group.

4. The method according to claim 2, wherein before inputting the two images in the image pair to the identity coding network module, the method further comprises:
    adding noise to image areas of objects in the two images in the image pair.

5. The method according to claim 1, wherein performing feature exchange processing on the image pair in the image sample group to obtain the new image pair comprises:
    inputting a first feature and a second feature of an image in the image pair in the image sample group to a generation network module of the neural network; and
    performing the feature exchange processing on the image pair in the image sample group by means of the generation network module to obtain the new image pair.

6. The method according to claim 1,
    wherein if an input image pair comprises images of a same object,
        performing feature exchange processing on the image pair in the image sample group to obtain the new image pair comprises: performing the feature exchange processing on the images in the image pair once to obtain the new image pair, and
        performing the feature exchange processing on the images in the image pair once to obtain the new image pair comprises: generating a new first image by using the first feature of the first image and the second feature of the second image in the image pair, and generating a new second image by using the second feature of the first image and the first feature of the second image, and/or
    wherein if the input image pair are images of different objects,
        performing feature exchange processing on the image pair in the image sample group to obtain the new image pair comprises: performing the feature exchange processing on the images in the image pair twice to obtain the new image pair, and
        performing the feature exchange processing on the images in the image pair twice to obtain the new image pair comprises:
            generating a first intermediate image by using the first feature of the first image and the second feature of the second image in the image pair, and generating a second intermediate image by using the second feature of the first image and the first feature of the second image; and
            generating a new first image by using a first feature of the first intermediate image and a second feature of the second intermediate image, and generating a new second image by using a second feature of the first intermediate image and a first feature of the second intermediate image.

7. The method according to claim 5, wherein obtaining the first loss value of the first classification result, the second loss value of the new image pair, and the third loss value of the first features and the second features of the new image pair in the preset manner comprises:
obtaining, in a second preset manner, the second loss value of the new image pair obtained by means of the network generation module relative to an original image pair, wherein the original image pair corresponds to the new image pair.

8. The method according to claim 1, wherein obtaining the first loss value of the first classification result, the second loss value of the new image pair, and the third loss value of the first features and the second features of the new image pair in the preset manner comprises:
obtaining the third loss value of the first features and the second features of the new image pair in a third preset manner based on the first features and the second features of the new image pair as well as first features and second features of the original image pair, wherein the original image pair corresponds to the new image pair.

9. The method according to claim 1, wherein after performing feature exchange processing on the image pair in the image sample group to obtain the new image pair, the method further comprises:
inputting the generated new image pair to a discrimination network module of the neural network to obtain a label feature representing reality of the new image pair; and
obtaining a fourth loss value of the new image pair in a fourth preset manner based on the label feature.

10. The method according to claim 9, wherein adjusting the parameters of the neural network at least according to the first loss value, the second loss value, and the third loss value until the preset requirement is met comprises:
obtaining a loss value of the neural network by using the first loss value, the second loss value, the third loss value, and the fourth loss value; and
adjusting the parameters of the neural network by using the loss value of the neural network until the preset requirement is met.

11. The method according to claim 10, wherein obtaining the loss value of the neural network by using the first loss value, the second loss value, the third loss value, and the fourth loss value comprises:
if the image sample group input to the neural network is the image pair of the same object, obtaining a first network loss value of the neural network in a fifth preset manner based on the first loss value, the second loss value, the third loss value, and the fourth loss value;
if the image sample group input to the neural network is the image pair of different objects, obtaining a second network loss value of the neural network in a sixth preset manner based on the first loss value, the second loss value, the third loss value, and the fourth loss value; and
obtaining the loss value of the neural network based on a sum result of the first network loss value and the second network loss value.

12. An image processing apparatus, comprising:
a processor; and
a memory configured to store processor-executable instructions,
wherein the processor is configured to invoke the instructions stored in the memory, so as to:
obtain an image sample group, wherein the image sample group comprises an image pair formed by images of a same object and an image pair formed by images of different objects;
obtain a first feature and a second feature of an image in the image sample group;
obtain a first classification result according to the first feature of the image;
perform feature exchange processing on an image pair in the image sample group to obtain a new image pair, wherein the feature exchange processing is to generate a new first image by using a first feature of a first image and a second feature of a second image in the image pair, and to generate a new second image by using a second feature of the first image and a first feature of the second image;
obtain a first loss value of the first classification result, a second loss value of the new image pair, and a third loss value of first features and second features of the new image pair in a preset manner; and
adjust parameters of the neural network at least according to the first loss value, the second loss value, and the third loss value until a preset requirement is met.

13. The apparatus according to claim 12, wherein obtaining the first feature and the second feature of the image in the image sample group comprises:
inputting two images in the image pair to an identity coding network module and an attribute coding network module of the neural network, and
obtaining first features of the two images in the image pair by using the identity coding network module, and obtaining second features of the two images in the image pair by using the attribute coding network module.

14. The apparatus according to claim 13, wherein obtaining the first loss value of the first classification result, the second loss value of the new image pair, and the third loss value of the first features and the second features of the new image pair in the preset manner comprises:
obtaining the first classification result of the first features obtained by means of the identity coding network module; and
obtaining the first loss value in a first preset manner according to the first classification result and a real classification result corresponding to the image in the image sample group.

15. The apparatus according to claim 13, wherein the processor is further configured to:
add noise to image areas of objects in the two images in the image pair before inputting the two images in the image pair to the identity coding network module.

16. The apparatus according to claim 12,
wherein if an input image pair comprises images of a same object,
performing feature exchange processing on the image pair in the image sample group to obtain the new image pair comprises: performing the feature exchange processing on the images in the image pair once to obtain the new image pair, and
performing the feature exchange processing on the images in the image pair once to obtain the new image pair comprises: generating a new first image by using the first feature of the first image and the second feature of the second image in the image pair, and generating a new second image by using the second feature of the first image and the first feature of the second image, and/or wherein if the input image pair are images of different object, performing feature exchange processing on the image pair in the image sample group to obtain the new image pair comprises: performing the feature exchange processing on the images in the image pair twice to obtain the new image pair, and performing the feature exchange processing on the images in the image pair twice to obtain the new image pair comprises:

generating a first intermediate image by using the first feature of the first image and the second feature of the second image in the image pair, and generating a second intermediate image by using the second feature of the first image and the first feature of the second image; and generating a new first image by using a first feature of the first intermediate image and a second feature of the second intermediate image, and generating a new second image by using a second feature of the first intermediate image and a first feature of the second intermediate image.

17. The apparatus according to claim 16, wherein obtaining the first loss value of the first classification result, the second loss value of the new image pair, and the third loss value of the first features and the second features of the new image pair in the preset manner comprises:

obtaining, in a second preset manner, the second loss value of the new image pair obtained by means of the network generation module relative to an original image pair, wherein the original image pair corresponds to the new image pair.

18. The apparatus according to claim 12, wherein obtaining the first loss value of the first classification result, the second loss value of the new image pair, and the third loss value of the first features and the second features of the new image pair in the preset manner comprises:

obtaining the third loss value of the first features and second features of the new image pair in a third preset manner based on the first features and the second features of the new image pair as well as first features and second features of the original image pair, wherein the original image pair corresponds to the new image pair.

19. The apparatus according to claim 12, wherein the processor is further configured to:

receive the new image pair, and obtain a label feature representing reality of the new image pair; and obtain a fourth loss value of the new image pair in a fourth preset manner based on the label feature.

20. A non-transitory computer-readable storage medium, having computer program instructions stored thereon, wherein when the computer program instructions are executed by a processor, the processor is caused to perform the operations of:

obtaining an image sample group, wherein the image sample group comprises an image pair formed by images of a same object and an image pair formed by images of different objects;

obtaining a first feature and a second feature of an image in the image sample group, and obtaining a first classification result by using the first feature of the image, wherein the first feature comprises an identity feature, and the second feature comprises an attribute feature;

performing feature exchange processing on an image pair in the image sample group to obtain a new image pair, wherein the feature exchange processing is to generate a new first image by using a first feature of a first image and a second feature of a second image in the image pair, and to generate a new second image by using a second feature of the first image and a first feature of the second image;

obtaining a first loss value of the first classification result, a second loss value of the new image pair, and a third loss value of first features and second features of the new image pair in a preset manner; and adjusting parameters of the neural network at least according to the first loss value, the second loss value, and the third loss value until a preset requirement is met.

* * * * *